United States Patent [19]

Takematsu et al.

[11] 4,027,110
[45] May 31, 1977

[54] KEY TELEPHONE SYSTEM

[75] Inventors: Hikaru Takematsu, Higashikurume; Akihiko Suzuki, Mitaka, both of Japan

[73] Assignee: Iwasaki Tsushinki Kabushiki Kaisha, Japan

[22] Filed: Dec. 3, 1974

[21] Appl. No.: 529,050

[30] Foreign Application Priority Data

| Dec. 5, 1973 | Japan | 48-135276 |
| Dec. 5, 1973 | Japan | 48-135277 |
| Dec. 14, 1973 | Japan | 48-138755 |
| Dec. 14, 1973 | Japan | 48-138756 |
| Dec. 14, 1973 | Japan | 48-138757 |

[52] U.S. Cl. .................................................. 179/99
[51] Int. Cl.² ............................................ H04M 1/72
[58] Field of Search ..................................... 179/99

[56] References Cited
UNITED STATES PATENTS

| 3,549,820 | 12/1970 | Knollman | 179/99 |
| 3,604,857 | 9/1971 | Opferman | 179/99 |
| 3,701,855 | 10/1972 | Reynolds | 179/99 |
| 3,787,631 | 1/1974 | Lewis | 179/99 |
| 3,843,845 | 10/1974 | Ridley | 179/99 |

*Primary Examiner*—Kathleen H. Claffy
*Assistant Examiner*—Randall P. Myers
*Attorney, Agent, or Firm*—Robert E. Burns; Emmanuel J. Lobato; Bruce L. Adams

[57] ABSTRACT

A telephone set scanning type key telephone system, in which a plurality of key telephone sets are connected in parallel, to a key service unit through control lines composed of a display information line, key information line, a terminal selecting line and a clock line. Each key telephone set comprises a display memory, a key memory, a terminal coincidence circuit and a gate. The terminal coincidence circuit collates a selecting code transmitted thereto from the key service unit through the terminal selecting line and applies clock pulses transmitted thereto from the key service unit through the clock line to the gate to drive the display memory and the key memory only when the selecting code is coincident with the terminal number. A driving signal transmitted in the serial configuration from the key service unit through the display information line is stored in the display memory to develope a display and, at the same time, the key information stored in the key memory is applied in the serial configuration to the key service unit through the key information line.

5 Claims, 9 Drawing Figures

| BIT TIME | CONTROL SIGNAL | CONTROL | CONTROLLED OBJECT |
|---|---|---|---|
| 0 | $\phi_p$ | PARALLEL STORING OF DATA | 112(Fig.2) 258(Fig.3) |
| 1,2,....16 | $\phi_s$ | TRANSMISSION OF DATA | 112(Fig.2) 210,258(Fig.3) |
| 17 | $\phi_o$ , ($\phi_c$) | TEST CONTROL DETECTION OF HOOK(INTERCOMM. LINE) | 263, 242 (219, 247) (Fig.3) |
| 18 | $\phi_1$ | PROCESSING OF DATA | 229 - 242 (Fig.3) |
| 19 | $\phi_2$ | | |
| 20 | $\phi_3$ | | |
| 21 | $\phi_c$ | STEPPING OF SCANNING | 263, 219, 247 (Fig.3) |

KEY TELEPHONE SYSTEM

This invention relates to a key telephone system in which telephone lines, extension lines (intercommunication line) and control lines are arranged between a telephone key service unit and a plurality of key telephone sets.

In conventional systems of this kind, a message line, a control line and a lamp line are provided for each telephone channel, and an extension inter-call line is provided for each telephone set. The lines are controlled by DC signals. Therefore, the number of cable conductors between the key service unit and the telephone sets increases in proportion to the number of telephone channels and the number of telephone sets. In a large-sized system, for example, a system accomodating 10 telephone channels and 30 telephone sets, the number of cable conductors used is as large as 80 to 100. Consequently, the conventional systems are defective in that (1) the cost of construction (costs of cables, connectors, etc. and wages) is appreciably high even in the initial estimation, in that (2) an addition and a change of service functions require re-wiring at terminals in some cases, and hence are troublesome and in that (3) an addition of a new service function for each telephone set requires an increase in the number of cable conductors.

One object of this invention is to provide an economical key telephone system which employs a digital pulse transmission central control system and is easy to construct and capable of diversification of services.

Another object of this invention is to provide a key telephone system which utilizes a feature of conventional key telephone systems, that is, mechanical connection to talking circuits by an all-branch wiring system and interlocking key-actuated switches, to ensure a talking-maintaining function during an electric power failure, and which at the same time reduces the number of conductors, and simplifies construction to thereby reduce the cost of construction and the wages therefor.

Still another object of this invention is to provide a key telephone system which allows ease in addition and change of services.

To attain the above objects, in the system of this invention, terminal equipments in the key telephone sets are sequentially scanned at high speed by a common control circuit of the key service unit in a time-division manner to serially apply data (actuating information at terminals equipment,s display information of the common control circuit, etc.) to a bus line and simultaneously transmit-and-receive the data between the terminal equipments and the common control circuit, thus reducing the number of conductors of control lines. As an interface between each terminal and each telephone line (connected to a central office or a private branch exchange), a circuit employing contacts of a relay for monitoring for an electric power failure and of a relay for seizing a telephone channel is used.

Since the terminal equipments are scanned in the time-division manner as mentioned above, the system of this invention has the following features in function.

1. In case of distributing calls from respective CO lines to the key telephone sets, it can easily be programmed in the key service unit.
2. When many CO lines are in the holding state, a lamp indication of each CO line at the terminal equipment can be made different from the others so as to discriminate the CO line of the calling party, that is, self-holding discrimination can be achieved.
3. A privacy function can be obtained by one-touch operation and no limitation is imposed on the timing of operation. Further, in the case of private talking between extension lines, both calling and called parties can effect the operation for privacy function.

This invention will hereinafter be described in detail below with reference to the drawings, in which.

Figure 1:
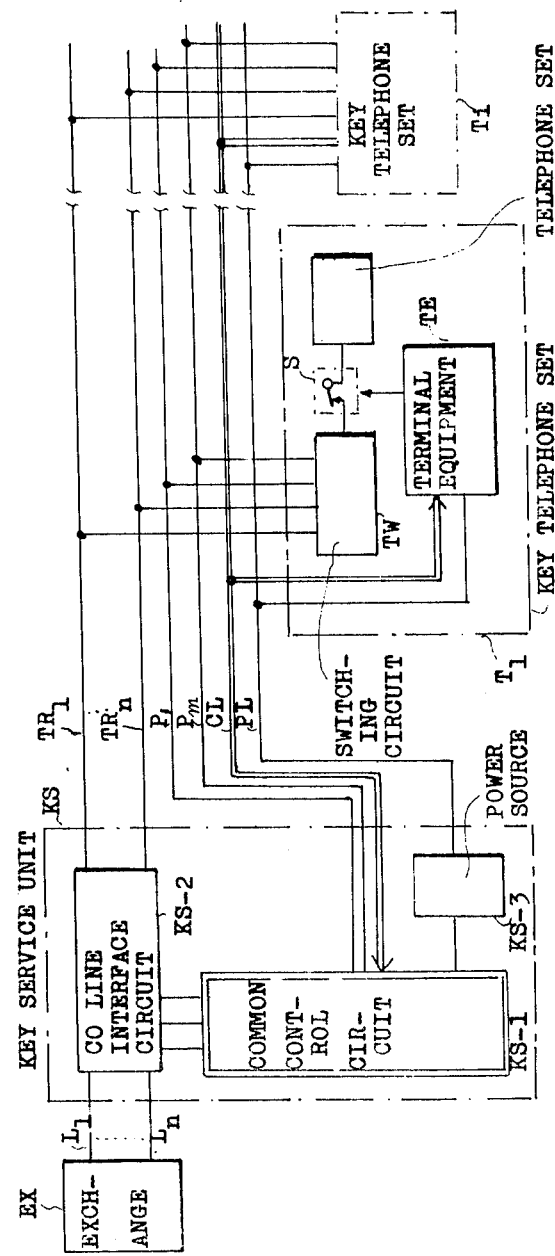
FIG. 1 is a connection diagram showing the principal construction of the system of this invention.

In FIG. 1 showing the connection system of this invention, reference character KS indicates a main equipment; $T_1$ to $T_i$ designate $i$'s key telephone sets; EX identifies a central exchange office (or a private branch exchange); $L_1$ to $L_n$ denote $n$'s CO lines connected to the key service unit and $TR_1$ to $TR_n$, $P_1$ to $P_m$, CL and PL represent lines connecting between the key service unit KS and the key telephone sets, respectively. The lines $TR_1$ to $TR_n$ are $n$'s CO lines; the lines $P_1$ to $P_m$ are $m$'s extension lines; the lines CL are control lines through which lamp, key and other control information is transmitted; and the line PL comprises a power line and a grounding line. The key telephone sets $T_1$ to $T_i$ are connected by the above lines in parallel with one another. In the key service unit KS, a CO line interface circuit KS-2 is composed of a CO line call receiving circuit and a hold circuit and is controlled by a common control circuit KS-1. In the key telephone sets $T_1$ to $T_i$, a telephone circuit-switching circuit TW is formed with an interlocking key-actuated switch and is ganged with a key in a terminal equipment TE. Reference character S identifies a break contact of a privacy function relay controlled by the terminal equipment TE.

In FIG. 1, the thick-line parts are principal parts to which this invention is related, and will be described in detail in FIG. 2.

Figure 2:
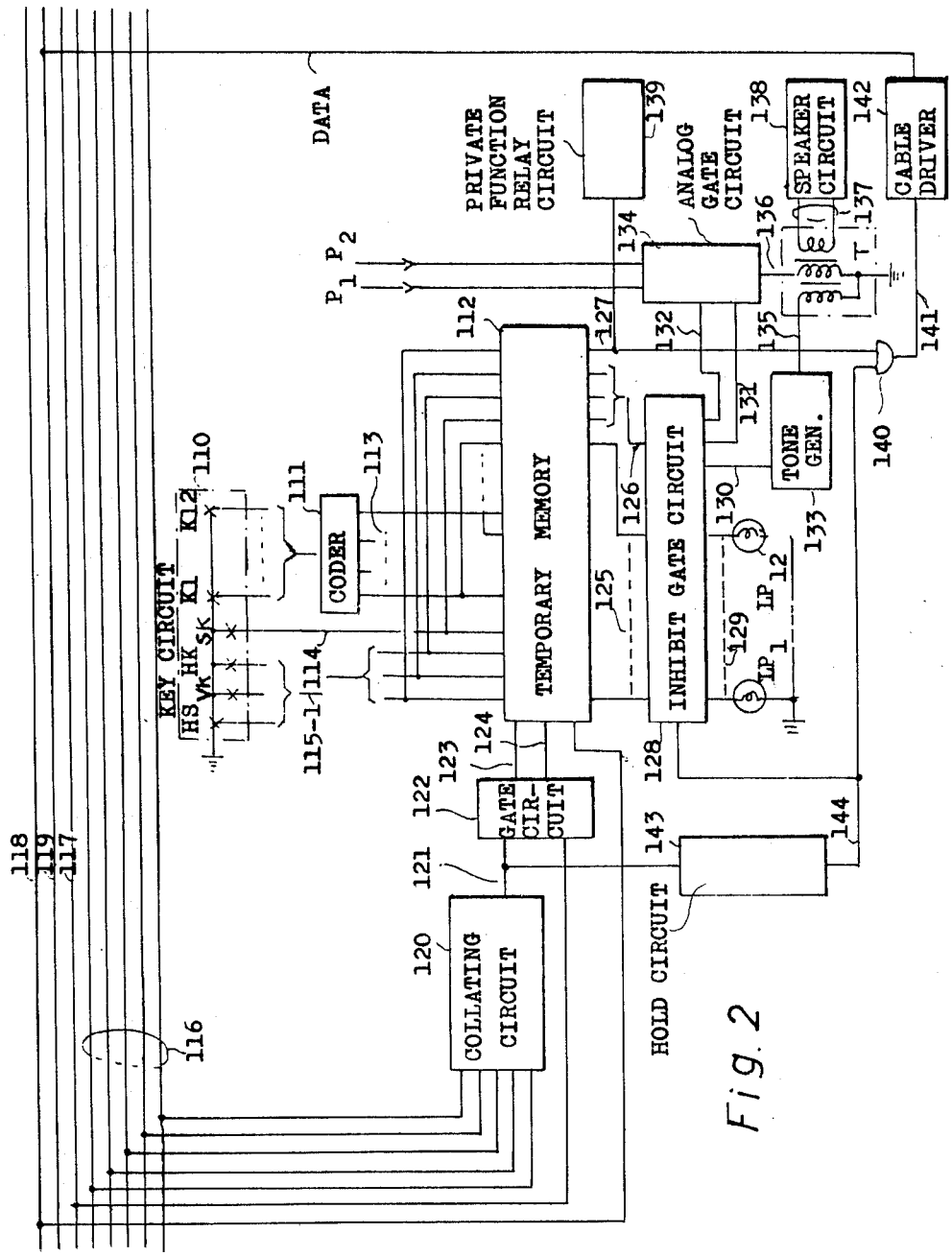
FIG. 2 is a block diagram illustrating in detail a terminal equipment in FIG. 1.

In FIG. 2, reference numeral 110 indicates a key circuit; and reference character HS designates a hook switch; VK identifies a non-locking key for voice inter-call and general calling use; HK denotes a non-locking key for holding; SK represents a switching key for privacy function; and $K_1$ to $K_{12}$ show telephone channel selecting locking keys. The keys $K_1$ to $K_{12}$ are ganged with the telephone channel-switching circuit TW shown in FIG. 1 and the locked key is restored by pressing another key by releasing the hook switch. Reference numeral 111 designates a coder for converting key information into a code unit which can be represented by a small number of digits (for example, binary); 112 indicates a temporary memory for storing key actuating information of the key circuit 110 and display information from the common control circuit KS-1 of FIG. 1 for periods of time corresponding to one clock and one frame, respectively. This temporary memory 112 is formed by a shift register having parallel-in, serial-in, parallel-out and serial-out functions. The outputs of the coder 111 and the keys SK and HS to HK are branched and connected to the parallel-in side of the temporary memory 112 through connecting lines 113, 114 and 115, respectively, in such a manner that the same actuating information is divided into two parts and stored in the temporary memory 112 in parallel just like mirror images. This is to detect in the common control circuit KS-1 of FIG. 1 a transmission error of information transmitted thereto from the terminal equipment TE through a transmission cable.

Reference numerals 116 to 119 identify control lines connected to the common control circuit KS-1. Through the lines 116, 117 and 118 are respectively transmitted a terminal selecting code, a clock separating signal for storage and transmission and display information from the common control circuit KS-1. Reference numeral 120 designates a collating circuit which fixedly stores terminal numbers and detects coincidence of the stored terminal numbers with the selecting code from the control line 116, and from the output 121 of which circuit 120 is derived a signal represented by a logical equation $(\phi_p + \phi_s) \cdot C_p$ only when coincidence is detected, where $\phi_p$ is control pulses for parallel storing of data, $\phi_s$ is control pulses for transmission of the data and $C_p$ is clock pulses. This will be described in detail laterin connection with FIG. 5. Reference numeral 122 represents a gate circuit which separates the above pulses with the pulses transmitted through the control line 117 and derives from its outputs 123 and 124 pulse trains represented by logical equations $\phi_p \cdot C_p$ and $\phi_s \cdot C_p$, respectively. These pulse trains are used as memory clock pulses and shift clock pulses of the temporary memory 112. By the memory clock pulses, the key actuating information is stored in parallel configuration in the temporary memory 112 and then, by the shift clock pulses, the display information from the control line 118 is serially stored in the temporary memory 112. However, in this case, the key actuating information previously stored is read out of the temporary memory 112 and transmitted through the control line 119 to the common control circuit KS-1 of FIG. 1. The stored display information appears as lamp, ringer and privacy function control signals at outputs 125, 126 and 127 of the parallel-out side of the temporary memory 112, respectively. Reference numeral 128 denotes an inhibit gate circuit for preventing a lamp from being lighted at low brightness during a time where the data is shifted in the temporary memory 112, and for preventing a ringer from ringing in the absence of calling. The output 129 of the inhibit gate circuit 128 drives telephone channel lamps $LP_1$ to $LP_{12}$ corresponding to the output 112 of the temporary memory 125. Further, another output 130 and other outputs 131 and 132 respectively drive a tone generator 133 for generating a tone indicative of an incoming call to a CO line and an analog gate circuit 134 for passing therethrough an intercomm line ringing or a voice signal transmitted from the common control circuit KS-1 of FIG. 1 through the lines $P_1$ to $P_2$, corresponding to the CO call control signal of the connection line 126 and call control signals of intercomm lines 1 and 2. The output 135 and 136 respectively derived by the tone generator 133 and the analog gate circuit 134 are coupled with each other in a transformer T and applied through a connection line 137 to a speaker circuit 138 composed of an amplifier and a speaker. Reference numeral 139 identifies a privacy function relay circuit, whose relays are actuated by the privacy function control signal of the connection line 127 to cut off a telephone set talking line at its contact (indicated by S in FIG. 1). Reference numeral 140 indicates an AND gate for transmitting only the key actuating information of a selected terminal equipment to the common control circuit KS-1, and its input is connected to the output 127 of the serial-out side of the temporary memory 112. Its output 141 is wired-OR or diode-OR connected to the connection line 119 at the output side of a cable driver 142. Reference numeral 143 designates a hold circuit, which converts a pulse train appearing in the connection line 121 into a continuous signal, and whose output 144 is applied as an inhibit input to the inhibit gate circuit 128 and as a control input to the gate circuit 140.

Figure 3:
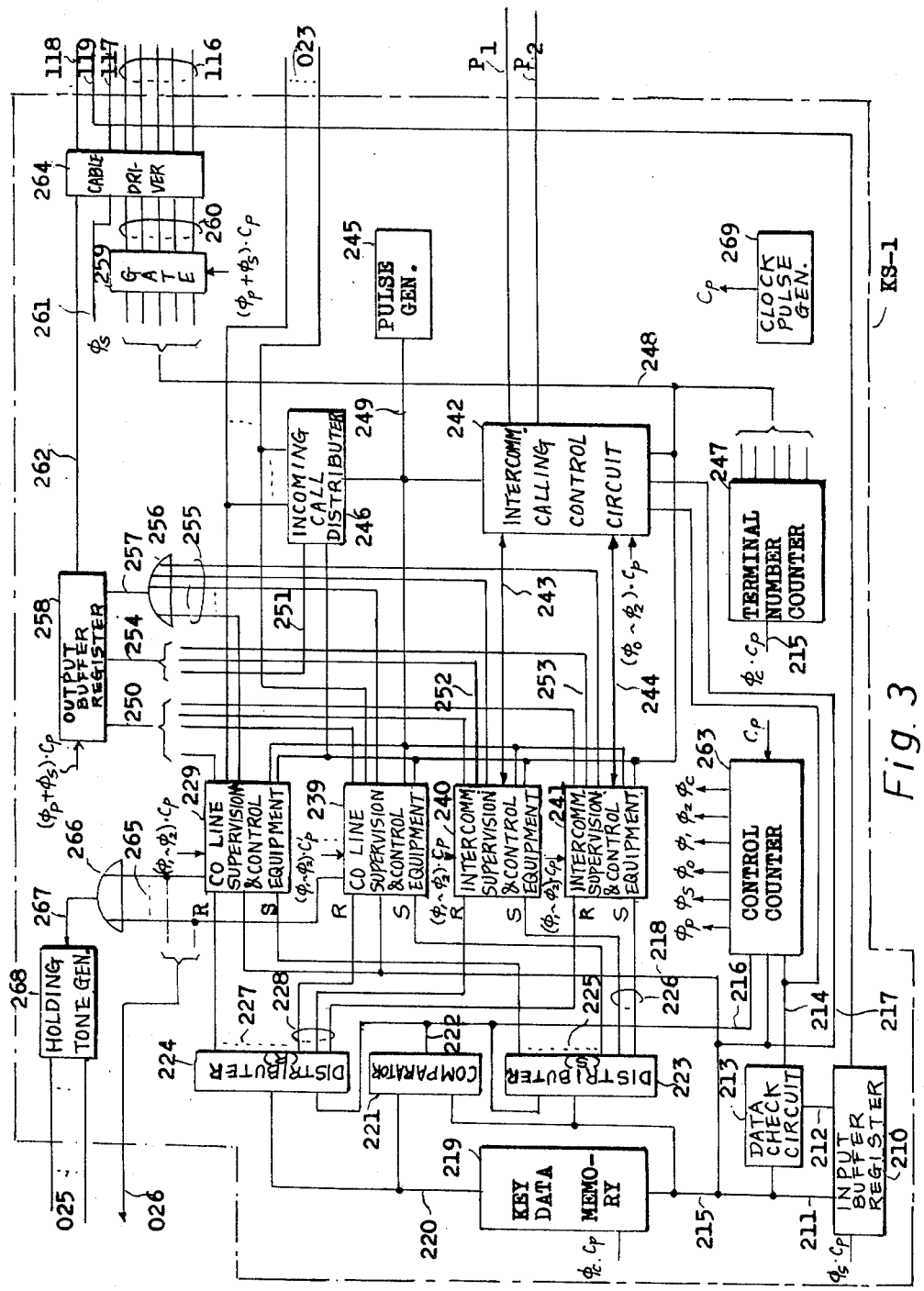
FIG. 3 is a block diagram showing in detail a common control unit in FIG. 1.

In FIG. 3, reference numeral 210 identifies an input buffer register for temporarily storing the key information transmitted from the terminal equipment TE through the connection line 119. The input buffer register 210 is formed by a shift register having serial-in and parallel-out functions. At its outputs 211 and 212, the same data in reverse order appears, if no transmission error exists. Reference numeral 213 designates a data check circuit which detects a transmission error and detects coincidence of all bits of the outputs 211 and 212 and derives from its output 214 a code 1 where no error exists. All of the data are sent out to the connection line 211 but, in a connection line 215, data representative of selected ones of the telephone channels, privacy function or voice calling are taken out; in a connection line 216, the data of holding and hook are taken out; in a connection line 217, the data of hook is taken out; and, in a connection line 218, the data of holding is taken out. Reference numeral 219 denotes a key data memory, which stores actuating information for telephone channels, privacy function and voice calling of all the telephone sets, and which is formed by a shift register having serial-in and serial-out functions. At the output 220 of the key data memory 219, the data of the immediately preceding frame appears when the terminal equipments TE are scanned. Reference numeral 221 indicates a comparator which compares new data of the connection line 215 with the data of the immediately preceding frame in the output 220 to detect whether a new operation has been effected at the terminals. The circuit 221 derives from its output 222 a code 1 when detecting a change between the compared data.

Reference numerals 223 and 224 represent distributers which discriminate operational information at the terminal equipments TE and distribute it to supervision and-control equipments 229 to 241 of respective telephone channels, and which are each composed of a telephone channel decoder and a group of AND gates. Reference numerals 229 to 239 indicate CO line supervision-and-control equipments, each composed of memories for telephone channel seizing, holding and privacy function, a terminal number memory for storing the terminal equipment TE having effected any of the above operations, a terminal signal selecting circuit and a display selecting circuit as will be described in detail later with regard to FIG. 6. Reference numerals 240 to 241 designate intercom supervision and control equipment, each of which comprises memories for telephone channel calling, telephone channel answering, voice calling, calling party operating privacy function and called party operating privacy function, a terminal number memory, a terminal signal selecting circuit and a display selecting circuit (not shown).

The memories in the intercommunication supervision and control equipments 229 to 241 are set by the outputs 225 and 226 from the signal distributer 223 when the signal in the connection line 222 is the code 1, and they are reset by the outputs 227 and 288 from the signal distributer 224. The connection lines 225 and 227 are connected to the CO line supervision-and-control equipments to pass therethrough CO line seizing and privacy function signals. Further, the connection lines 226 and 228 are connected to the intercommunication supervision and control equipment 240 and 241 and pass therethrough extension line seizing, voice calling and privacy function signals. A CO line holding signal is applied to the intercommunication supervision and control equipments 229 to 239 through the connection line 218. Reference numeral 242 identifies an intercommunication calling control circuit, which is composed of a dial counting circuit, an intercomm ringing and busy signal generator, an intercommunication connecting circuit, a called party idle discrimination circuit and a lock-out circuit for shutout of calls from other intercommunication lines while this circuit 242 is occupied. Reference numerals 243 and 244 represent connection lines for transmitting control signals between the intercommunication supervision and control equipments 240 and 241 and the intercommunication calling control circuit 242. Reference numeral 245 denotes a pulse generator for producing various pulses (of, for example, 1Hz, 2Hz, 4Hz, etc.) for discrimination of calling, holding and self-holding; 246 shows an incoming call distributer which is capable of programming CO line call information (023) from the common control circuit KS-1 of FIG. 1 and distributing it as a ringer signal to a specified one of the terminal equipments TE as will be described in detail later with regard to FIG. 7. Reference numeral 247 refers to a counter (hereinafter called a terminal numeral counter) which counts pulses of the connection line 215 and sequentially designates terminal equipments TE to enable data transmission and reception and, at the same time, effects processing for the designated terminal equipment TE. Its output 248 is applied to the supervision and control equipments 229 to 241, the incoming call distributing circuit 246 and others.

Reference numeral 250 indicates lamp indication display outputs of the supervision and control equipments 229 to 241. The discrimination signals of telephone channel calling, holding and self-holding are supplied from the output 249 of the pulse generator 245. Reference numeral 254 designates ringer or voice calling indication outputs, which are composed of a CO line output 251 of the incoming call distributer 246 and intercommunication line outputs 252 and 257 of the intercommunication supervision and control equipments 240 and 241. In the case of ringer information, such pulses as synchronized with the lighting period of a lamp, they are applied from the pulse generator 245 to the circuits 229 to 241 and 246. The output 251 of the incoming call distributer 246 produces a code 1 only when the terminal equipment TE designated by the incoming call distributor 246 is scanned. The outputs 252 and 253 provide a code 1 only when a called terminal equipment TE indicated by the output of a dial counting circuit (not shown) of the intercommunication line calling control circuit 242 is scanned. Reference numeral 255 identifies privacy function indicating outputs of the supervision and control equipments 229 to 241, which outputs produce a code 1 only when a terminal equipment TE to be interrupted is scanned if the privacy function switch (SK of the key circuit 110 in FIG. 2) of the terminal of the telephone channel used is on the side of the privacy function. Reference numeral 256 represents an OR gate for obtaining the logical sum of the outputs 255, and 257 denotes its output. Reference numeral 258 shows an ouput buffer register which temporarily stores in the parallel configuration lamp display information of a line 250, ringer and voice calling display information of a line 254 and privacy function display information of a line 257 and then transmits them in the serial configuration to terminal equipments, and which is formed by a shift register having parallel-in and serial-out functions.

Reference numeral 259 refers to a gate circuit which permits the passage therethrough of the terminal selecting signal of the line 248 only during data storage and transmission. Its outputs 260 are transmitted througha cable driver 264 to terminal equipments TE together with a $\phi_s$ (which is a code 1 during transmission and used as a signal for separating the memory clock pulses and the shift clock pulses from each other at terminal equipments TE) of a control counter 263 and an output 262 of the output buffer register 258. Reference numeral 265 indicates holding information outputs of the CO line supervision and control equipments 229 and 239, whose logical sum is obtained by an OR gate 266, and a holding tone generator 268 is driven by the output 267 of the OR gate 266. Parallel outputs 025 of the holding tone generator 268 are respectively connected to the holding circuits of CO lines (not shown) of the CO line interface circuit KS-2 of FIG. 1. The answering and holding information of the CO line supervision and control equipments 229 to 239 is applied to lines 026 to drive the CO line sezing relay and the electric power failure monitor relay shared by a receiving circuit and a holding circuit in the CO line interface circuit KS-2 of FIG. 1. Reference numeral 269 designates a clock pulse generator for generating a clock pulse train $C_p$. The system is controlled by the control counter 263 in synchronism with the clock pulses $C_p$ derived from the clock pulse generator 269.

Figures 4, 5:
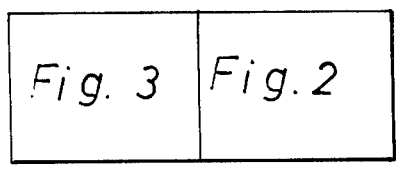
FIG. 4 is a diagram showing the connections between the terminal equipment of FIG. 2 and the common control circuit in FIG. 3.
FIG. 5 is a table explanatory of the operation of a control counter in FIG. 3.

FIG. 5 is a table, for explaining the operation of the control counter 263. Now, a supplemental description will be given of the system based on the table.

1. In the case of a bit time 0, the key actuating information at the terminal equipment TE and the output display information (information before the terminal equipment TE is scanned) in the common control circuit KS-1 are simultaneously stored in the temporary memory 112 and the output buffer register 258 in the parallel configuration, respectively.

2. In the case of bit times 1 to 16, the above stored information is shifted in the parallel configuration from the temporary memory 112 and the output buffer register 258 to the input buffer register 210 and the temporary memory 112 at the same time.

3. In the case of a bit time 17, the input signals to the control counter 263 (the lines 214, 216 and 222) are tested and, only where the transmitted information has no error (the code of the line 214 is 1) and a control operation can be regarded to be effected at the terminal equipment TE (the codes of holding and hook of the line 216 are 1 and the code of the line 222 is 1), the control counter 263 steps to bit times subsequent to 18 but, in the other cases, jumps to the bit time 0. Further, in a case where no error exists in the transmitted information (the code of the line 214 is 1) and no control operation is regarded to have been effected at the terminal equipment TE (the code of holding of the line 216 is 0 and the code of the line 222 is 0), the code of the signal $\phi_c$ is made to a state 1 and the terminal scanning is shifted step by step. Namely, the key data memory 219 is shifted by one bit and one count is added to the terminal number counter 247. Further, the signal $\phi_o$ is used in the case of intercommunication line calling, as a timing signal for detecting the hook information for idle discrimination of the called party but the hook information is applied from the line 217.

4. Bit times 18 to 20 are assigned to the control signals of the extension line monitor and controllers 221 to 242. 5. In the case of a bit time 21, the terminal scanning is shifted so that the control counter 263 jumps to the bit time 0.

As is apparent from the above, it is necessary that the number of bit times (16) necessary for the signal $\phi_s$ and the number of bits in the temporary memory 112, the line 212 and the output buffer register 258 are the same, and it is also necessary that the number of steps of the terminal number indicating counter 247 and the numbers of bits in the key data memory 219 are equal to each other and larger than the number (30) of the terminal equipments TE.

Figure 6:
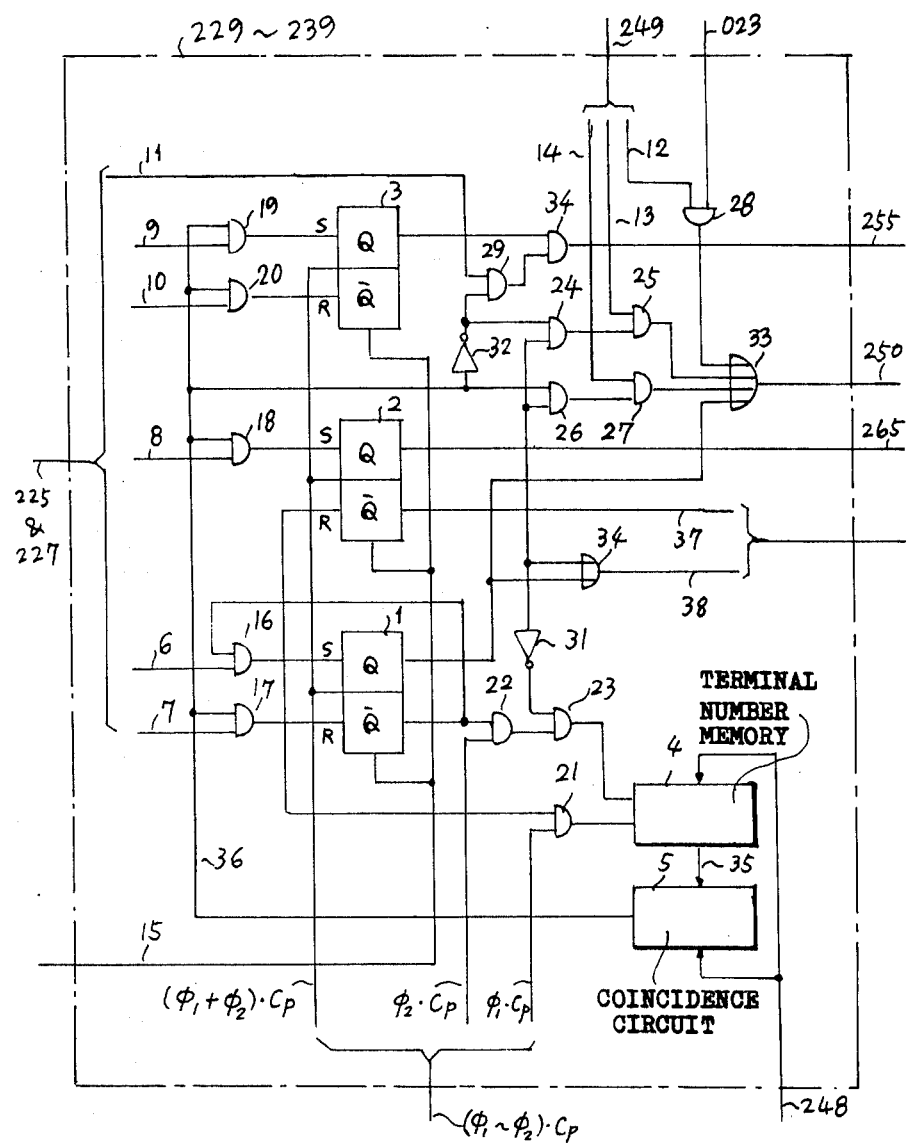
FIG. 6 is a block diagram illustrating a CO line supervision and control equipment in FIG. 3.

Turning now to FIG. 6, the CO line supervision and control equipments 229 to 239 will be described.

Reference numerals 1, 2 and 3 indicate memories for CO line seizing, holding and privacy function, respectively, which memories are each formed by a flip-flop having a forced reset function. Reference numeral 4 designates a terminal number memory for storing the terminal equipment number having at first seized a CO line. Its memory input is a 5-bit parallel output 248 of the terminal number indicating counter 247. Reference numeral 5 identifies a coincidence circuit for selecting operational information of only a terminal equipment TE having seized the CO line to set or reset the flip-flops 1 to 3. The input of the coincidence circuit 5 is connected to the output 35 of the memory 4 and the line 248. Reference numerals 6 to 11 represent signal lines indicating the contents of outputs 225 (S) and 227 (R) of the signal distributing circuits 224 and 225. The signal lines 6 and 7 are signal lines for CO line seizing and cancelling; the signal lines 9 and 10 are signal lines for CO line privacy function and privacy function removing; and the signal line 11 is connected to the output of a telephone channel decoder (not shown) in the signal distributer 224. Reference numerals 12 to 14 denote signal lines indicating the contents of the output 249 of the pulses generator 245. The lines 12, 13 and 14 are signal lines of 2Hz (call), 1Hz (holding) and 4Hz (self-holding discrimination), respectively, in the present example. Reference numeral 15 shows a line used for clearing the flip-flops 1 to 3 when the present system is connected to the power source, though not shown, and the line 15 is connected to reset terminals of the flip-flops 1 to 3. Reference numerals 16 to 30 refer to AND gates; 31 and 32 indicate inverters; and 33 and 34 designate OR gates. Reference numerals 37 and 38 identify control lines for driving an electric power failure monitor relay (T) and a CO line seizing relay (H). In the present example, during CO line seizing, the codes of the lines 37 and 38 are both 1 and, during holding, the codes of the lines 37 and 38 are 0 and 1, respectively.

The outline of the operation of the present example will hereinbelow be described.

1. CO line seizing

In the case where the CO line is idle, the output $\overline{Q}$ of the flip-flop 1 is 1, so that if a signal (the code 1) exists in the line 6, it is applied through the gate 16 to the flip-flop 1 to set it and, at the same time, the terminal equipment number is stored in the terminal number memory 4 using the output of the gate 21 as the memory clock pulses. Thereafter, the gate 16 does not accept any signal.

2. CO line cancelling

The code of the line 36 is 1 only when the terminal euqipment TE having seized the CO line is scanned, so that when cancelling signal of that terminal equipment TE is applied to the gate 7, it is applied through the gate 17 to the flip-flop 1 to reset it. Then, the terminal number memory 4 is cleared by using the output of the gate 23 as a clear clock.

3. Holding

If a holding signal (the code 1) of the terminal equipment TE having seized the CO line exists in the line 8, it is applied through the gate 18 to the flip-flop 2 to set it to provide Q = 1 and $\overline{Q}$ = 0. Reference numeral 31 indicates an inhibiting inverter for preventing clearing of the terminal number memory 4 until the holding CO line is seized (re-answering). The inhibiting circuit 31 is required for providing a lamp indication for self-holding discrimination together with the inverter 32. The flip-flop 1 is reset by holding.

4. Re-answering

Upon re-answering, the flip-flops 1 and 2 are set and reset by the output of the gate 16 respectively and the contents of the terminal number memory 4 are replaced by the number of the terminal having re-answered.

5. Privacy function and privacy function cancellation

If a privacy function signal of the terminal equipment TE having re-answered the CO line, it is applied through the gate 19 to the flip-flop 3 to set it to provide outputs Q and Q of 1 and 0 respectively. If another terminal equipment TE interrupts, a code 1 appears in the line 11, so that the code of the line 255 becomes 1 and a privacy function indicating code 1 is applied to that terminal equipment TE to actuate the privacy function relay. In the line 11, information of the terminal equipment TE having seized the CO line is also contained but it is inhibited by the inhibit gate 32. When a privacy function cancelling signal (a code 1) of the terminal equipment TE having seized the CO line appears in the line 10, it is applied through the gate 20 to the flip-flop 3, so that interruption can be freely effected.

Figure 7:
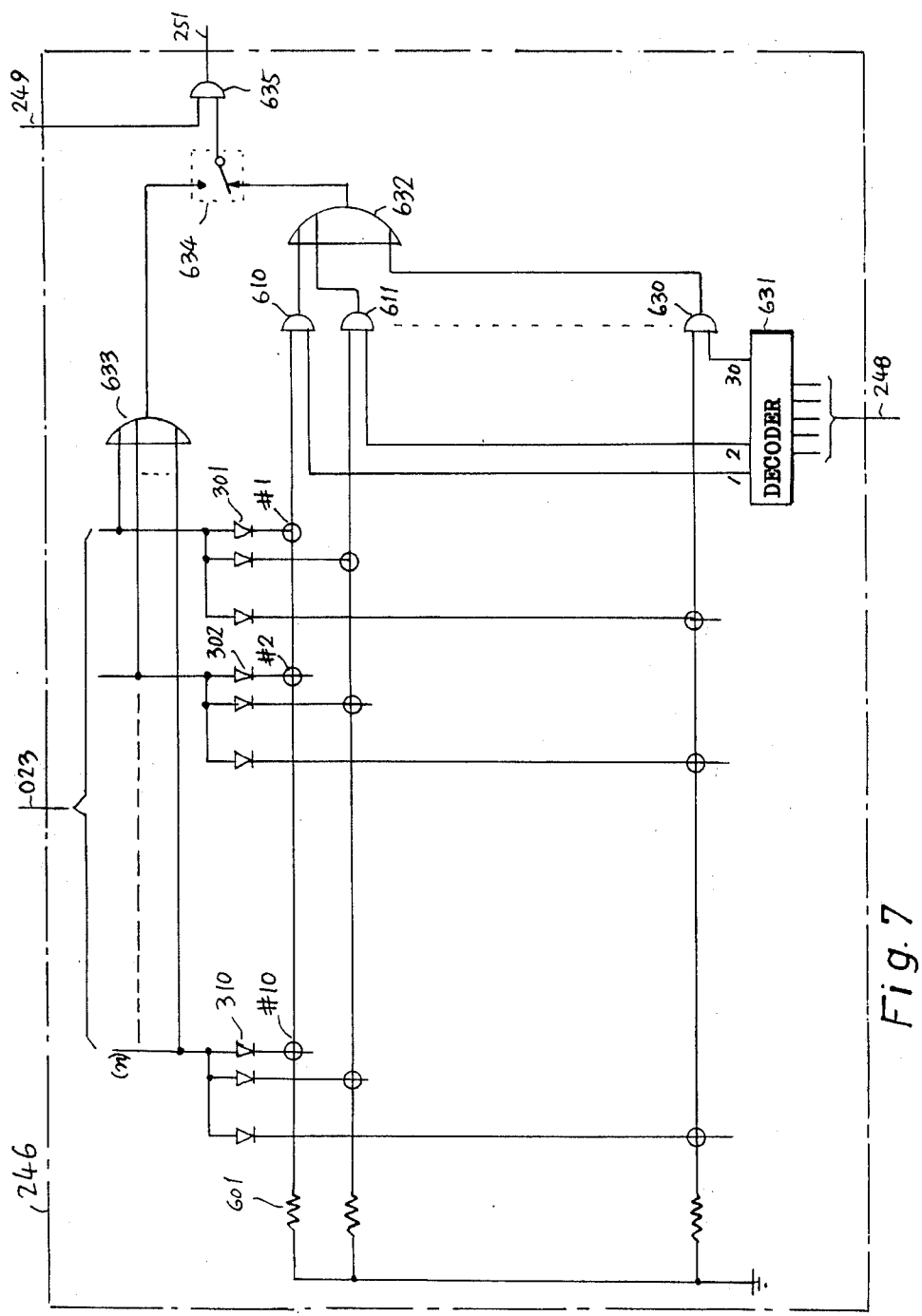
FIG. 7 is a circuit diagram showing a programmable CO line incoming call distributor in FIG. 3.

Next, a programmable CO line incoming call distributer 246 shown in FIG. 7 will be described. Mark No. 1 to No. 10 represent cross-points which can be short-circuited by pin terminals. Diodes 301 to 310 and resistors 601 or OR circuits formed by short-circuiting the cross-points No. 1 to No. 10. Reference numeral 631 indicates a decoder which has its inputs connected to the output 248 of the terminal number counter 247 and indicates the scanning time of each terminal equipment TE at its output; 610 to 630 designate AND gates for detecting coincidence of the outputs of the decoder 631 corresponding to the terminal equipments TE with the output of the aforesaid OR circuit connected to the output of the receiving circuit of each CO line (in the CO line interface circuit ME-2 in FIG. 1); 632 identifies an OR gate for combining the outputs of the AND gates 610 to 630; 633 denotes an OR gate for ringing ringers of all the terminal equipment TE upon reception of a call on the CO line; 634 represents a changeover switch actuatable for selecting a programmable CO line call or an entire CO line call; and 635 refers to an AND gate for passing therethrough an intermittent signal (of, for example, 1Hz) for a lamp indication when receiving a call.

In the telephone set scanning type key telephone system illustrated in FIGS. 2 and 3, the respective terminals are scanned by parallel selecting codes on terminal selecting lines, so that, if the number of telephone sets connected is taken as $i$, the number of the terminal selecting lines is required to be at least $k$ which satisfies $2^k \geq i$. Accordingly, the above system has a defect such that the number of terminal selecting lines increases with an increase in the number of telephone sets used, though in a stairstep manner.

Figure 8:
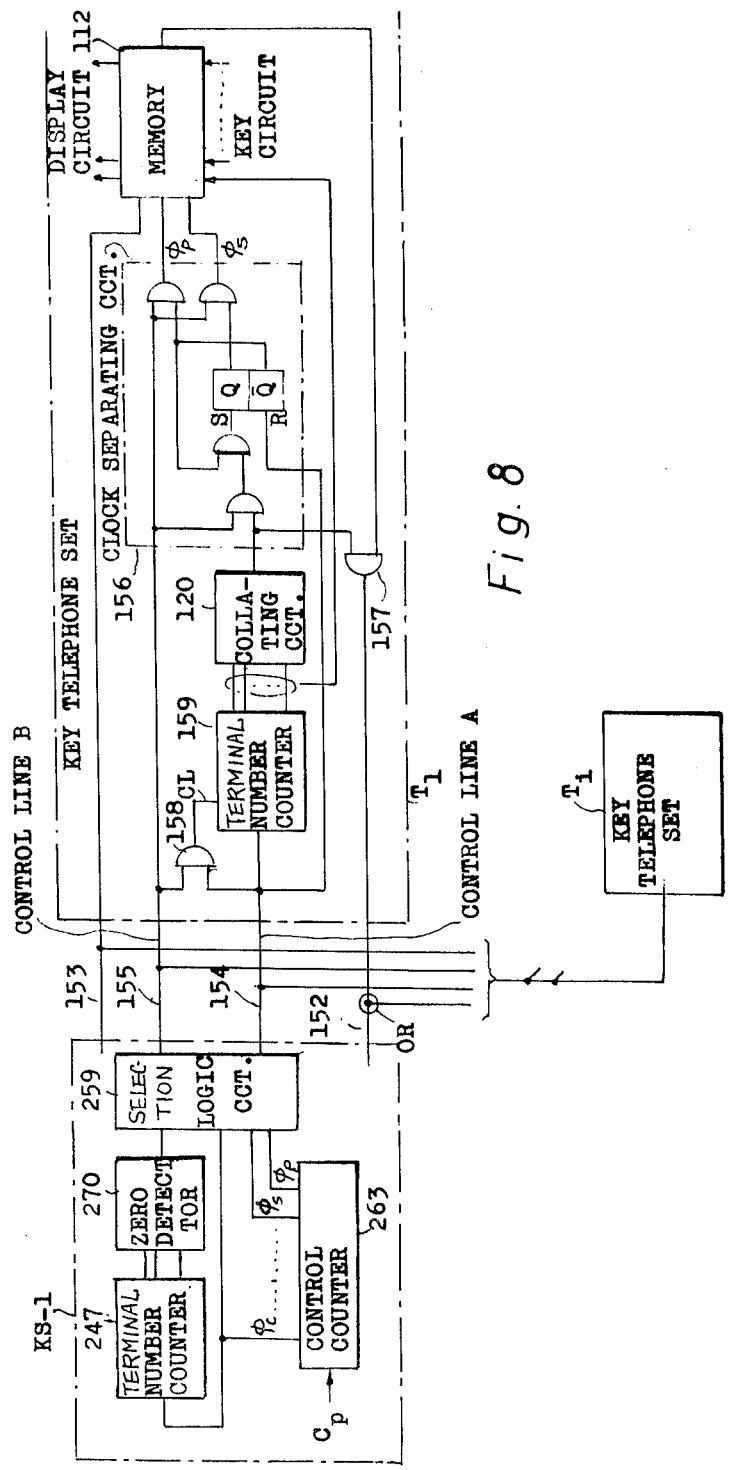
FIGS. 8 and 9 are connection diagrams illustrating examples of this invention in which the number of cable conductors is further reduced.

To avoid the above defect, in another example of this invention illustrated in FIG. 8, a terminal number counter 247 in the common control circuit KS-1 is used as a master while slave counters operating in synchronism with the master counter are provided at respective key telephone sets, so that their outputs are used as terminal selecting codes, thereby providing a telephone set scanning type key telephone system having a constant and small number of control lines.

In FIG. 8, reference character KS-1 indicates a common control circuit; and reference numerals 152, 153, 154 and 155 designates a key information lines, a display information line and control line of clocks A and B, respectively. Reference characters $T_1$ to $T_i$ denote $i$'s key telephone sets connected in parallel; reference numeral 156 identifies a clock separating circuit having a flip-flop and used as gate means for passing therethrough the control pulse train; and 157 and 158 represent AND gate circuits. A control counter 263 operates in synchronism with clock pulses (CP) to produce control pulse trains $\phi_P, \phi_S, \ldots \phi_C$ synchronized with the clock pulses one after another. The pulses $\phi_P$ are control pulses for parallel memory; the pulses $\phi_s$ are composed of control pulses for the transmission of information; and the pulses $\phi_C$ are control pulses for shifting the terminal scanning step by step. Between the pulses $\phi_S$ and $\phi_C$, control pulses for telephone line supervision and control are inserted. A selection logic circuit 259 applies the control pulses $\phi_P$ and $\phi_S$ to the clock line (B) 155 and the control pulse $\phi_C$ to the clock line (C) 154. When a terminal number counter 247 is zero, the circuit 259 is controlled by the output signal of a zero detector 270 to apply the control pulse $\phi_P$ (which may also be $\phi_S$ or $\phi_P + \phi_S$) to the control lines 154 and 155 and the control pulse $\phi_C$ to the control line 154. Accordingly, when the terminal number counter 247 is in its zero state, the pulse $\phi_P$ appears at the output of the AND gate 158, by which a terminal number counter 159 is cleared to be put in its zero state, so that the counter 159 is synchronized with the counter 247.

Thus, the counters 247 and 159 respectively serving as a master and a slave counter count the control pulses $\phi_C$ to indicate the same terminal number. Only when the output of the terminal number counter 159 indicates its key telephone set, a collating circuit 120 provides an output. The clock separating circuit 156 is mainly composed of a flip-flop which is set by a first control pulse $\phi_P$ of the pulse train $\phi_P + \phi_S$ from the control line 155 and reset by the control pulses $\phi_C$ of the control line 154, and provides the pulses $\phi_P$ and $\phi_S$ separately from each other and, at the same time, provides the basis for the subsequent scanning.

When a noise enters the cable conductor, the terminal number counter 159 counts it and its output does not agree with the output from the terminal number counter 247, with the result that the common control circuit KS-1 performs processing. To avoid this, as shown in FIG. 8, the output of the terminal number counter 159 is stored in the collating circuit 120 together with key information and applied to the common control circuit KS-1 to prevent it from performing processing when the outputs from the both counters are not in agreement with each other.

Figure 9:
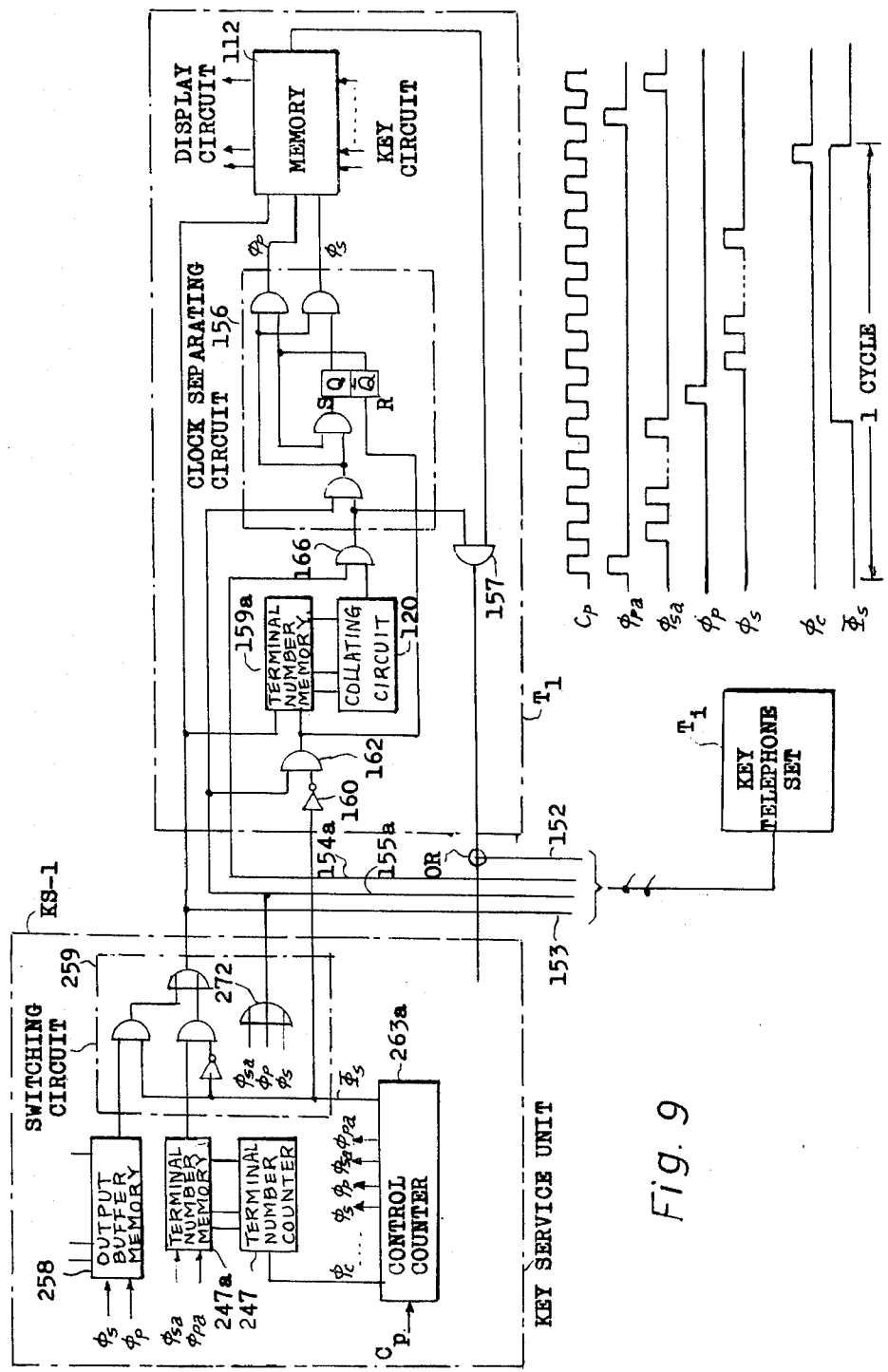

FIG. 9 illustrates another example of the key telephone system of this invention, in which the terminal number counter 159 in each of the key telephone sets $T_1$, $T_i$ in FIG. 8 is replaced by a terminal number memory 159a to produce the same effects as those obtainable in the example of FIG. 8. In FIG. 9, those elements identified by the same reference numerals and characters as those in FIG. 8 are exactly identical with the elements in FIG. 8, and the elements with a suffix $a$ have the same functions as in FIG. 8 but are a little modified. Now, the elements except those identical with the elements in FIG. 8 will be described in a sequential order. A control signal $\Phi_S$ are applied to the control counter 263, and its outputs are shown in the waveform diagram attached to FIG. 9. A terminal number memory 247a is a memory in which the output of the terminal number counter 247 is stored in the parallel configuration by the control clock pulses $\phi_{pa}$ and from which it is sent out in the serial configuration by the control clock pulses $\phi_{Sa}$ to the display information line 153 through a switching circuit 259. The memory 247a is formed by a shift register having the parallel-in and serial-out functions. An output buffer memory 258 is a memory in which the display information obtained as a result of processing in the common control circuit KS-1 is stored in the parallel configuration by the control clock pulses $\phi_{pa}$ and from which it is applied in the serial configuration by the control clock pulses $\phi_{Sa}$ to the display information line 153 through the switching circuit 259. The memory 258 is formed by a shift register having parallel-in and serial-out function. In practice, the same memory as shown in FIG. 9 is connected to the display information line 153, though not shown in FIG. 8. The switching circuit 259 is a logic circuit for switching the outputs from the terminal number memory 247a and the output buffer memory 258 by the control signal $\Phi_S$ and for applying them to the display information line. Reference numeral 272 indicates an OR gate, which applies the control clock pulses $\phi_{Sa}$, $\phi_P$ and $\phi_S$ to the clock line 155a. A control line 154 is a switching line for sending out the control signal $\Phi_S$ which enables to separate the terminal number and the display information at the key telephone sets $T_1$ to $T_i$. A terminal number memory 159a is a memory for storing in the serial configuration the contents of the terminal number memory 247a by the control clock pulses $\phi_{Sa}$, and this memory 159a is formed by a shift register having the serial-in and parallel-out and performs the same function as the terminal number counter 247. An inverter 160 and a AND gate 162 act to take out the control clock pulses $\phi_{Sa}$ from the control clock pulses $\phi_{Sa}$, $\phi_P$ and $\phi_S$ in a switching line 155a by the control signal $\Phi_S$ in the switching line 154a. Further, an AND gate 166 serves to apply to the clock separating circuit 156 only the control clock pulses $\phi_P$ and $\phi_S$ for actuating the indicating memory 112 when the key telephone set is scanned, and the input of the AND gate 166 is connected to the output of the terminal coincidence circuit 120 and the switching line 154a.

As is apparent from the foregoing, by the provision of the terminal number memories 247a and 159a each formed by a shift register for temporarily storing the contents of the terminal number counter 247 in place of the terminal number counter 159 operating in synchronism with the terminal number counter 247 in FIG. 8, such a telephone set scanning type key telephone system can be constructed which produces the same effect as those obtainable with the FIG. 8 example, that is, the effect that the number of conductors of the control lines is constant and small irrespective of the number of telephone sets used.

As has been described in the foregoing, the number of control lines can be made constant and small in accordance with this invention irrespective of the number of key telephone sets, so that it is possible to simplify construction and reduce the cost thereof.

What we claim is:

1. In a key telephone system including a key service unit to be connected in use to at least one CO line; a plurality of key telephone sets; control lines including a display information line, a key information line, a terminal selecting line and a clock line, and connecting said key service unit to said plurality of key telephone sets; wherein said key service unit comprises:
    a control counter for generating control clock pulse trains to temporarily store key information applied from said key telephone sets and display information to be sent out to said key telephone sets, to control the use and non-use of said CO lines, and to successively scan said key telephone sets;
    a terminal number counter connected to said control counter and said terminal selecting line for successively selecting said key telephone sets by sending out through said terminal selecting line predetermined selection codes in a time division manner;
    an input buffer register connected to said key information line for storing key information applied from said terminal telephone sets;
    a key data memory connected to said input buffer register to temporarily store the instant state of said key information representative of the use and non-use of said key telephone sets;
    CO line supervision-and-control means connected between the input and output of said key data memory for monitoring the state of use of said CO line and said key telephone sets by comparing the key information of an immediately preceding scanning period with the instant key information;
    display information control means connected to the output of said CO line supervision-and-control means for sending out corresponding display information; and an output buffer memory connected to said display information control means and said display information line to temporarily store said display information and send out the same to said display information line;
    and wherein each of said key telephone sets comprises:
    a terminal coincidence circuit connected to said terminal selecting line to generate a coincidence output only when one of said predetermined selection codes transmitted through said terminal selecting line coincides with the terminal number of the same key telephone set;
    gate means connected to said terminal coincidence circuit and said clock line for passing therethrough said control clock pulse trains from said clock lines in response to said coincidence output of said terminal coincidence circuit; and
    memory means connected to said gate means, said display information line, and said key information line for storing said display information from said display information from said display information line in response to said clock pulse trains from said gate means and for storing key information and sending the same through said key information line in response to said coincidence output from said terminal coincidence circuit.

2. A key telephone system according to claim 1, in which control lines A and B comprise said clock line and are provided for transmitting clock pulses A and clock pulses B respectively; each key telephone set having a slave counter which counts by said clock pulses A of the control line A and is reset by pulses simultaneously applied to the control lines A and B when said terminal number counter is in its zero state to be thereby synchronized with the master counter, the output of the slave counter being applied to said coincidence circuit of the same key telephone set for detecting the terminal number assigned to each key telephone set.

3. A key telephone system according to claim 1, in which control lines A and B comprise said clock line, and wherein a terminal number and display information are applied from the key service unit to the display information line; the terminal number being stored in a terminal number memory of each key telephone set, the output of the terminal number memory being applied to said terminal coincidence circuit for detecting the terminal number assigned to each terminal control clock pulses for driving said memory means and being applied in a serial signal configuration to the control line A from the key service unit and, at the same time, a switching signal being applied to the control line B from the key service unit in order that the display information be controlled by the output of the terminal coincidence circuit and stored in said memory means of each key telephone set, so that the control clock pulses can be separated under control of the switching signal in each key telephone set.

4. A key telephone system according to claim 1, in which said selection codes synchronized with clock pulses are applied to the terminal selecting line while being superimposed on said clock pulses, said memory means being actuated by a clock pulse train appearing at the output of said terminal coincidence circuit for detecting the terminal number assigned to each key telephone set in response to a signal obtained by smoothing the pulse train, the contents of said memory means being provided as an output and the output of said memory means being inhibited during an actuated time of said memory means.

5. A key telephone system according to claim 1, in which transmission, reception and storage of key information and display information are performed in each key telephone set by a pulse train of the same selection code synchronized with the clock pulses sent out in the parallel signal configuration from the key service unit, the pulse train being separated by a clock separating circuit provided in each key telephone set into a least a first one bit pulse and the remaining pulses, the key information being once stored by the one bit pulse in said memory means, and the stored contents being applied by the other pulses to said key service unit and, in turn, the display information from said key service unit being stored in said memory means.

* * * * *